United States Patent [19]

Held

[11] 4,203,258
[45] May 20, 1980

[54] GEAR FINISHING MACHINE

[76] Inventor: Gerhard R. Held, 22644 Shiell Dr., Mt. Clemens, Mich. 48043

[21] Appl. No.: 972,207

[22] Filed: Dec. 22, 1978

[51] Int. Cl.$^2$ .............................................. B24B 5/00
[52] U.S. Cl. ............................ 51/95 GH; 51/105 HB; 409/5; 409/11
[58] Field of Search ................... 51/26, 95 R, 95 GH, 51/95 WH, 105 R, 105 HB, 105 GG, 287; 409/5, 11

[56] References Cited

U.S. PATENT DOCUMENTS

| | | | |
|---|---|---|---|
| 1,570,372 | 1/1926 | Buckingham | 409/5 X |
| 2,554,740 | 5/1951 | Jellis et al. | 51/105 HB |
| 2,607,175 | 8/1952 | Osplack | 51/287 |
| 3,006,117 | 10/1961 | Motz | 51/105.6 |
| 3,200,711 | 8/1965 | Rogg | 51/95.6 H X |
| 3,443,341 | 5/1969 | Honda et al. | 51/95.6 H X |
| 3,589,073 | 6/1971 | Okamoto et al. | 51/95.6 H |
| 3,971,293 | 7/1976 | Hunkeler | 51/105 HB X |

Primary Examiner—Gary L. Smith
Assistant Examiner—Robert P. Olszewski
Attorney, Agent, or Firm—Cullen, Sloman, Cantor, Grauer, Scott & Rutherford

[57] ABSTRACT

In a gear finishing or other machine having a base, a table support mounting a reciprocal table having a head stock and a tail stock for supporting a workpiece gear or spline to be finished, a pedestal on the base mounting a motor-operated transmission and a depending machine head mounting a power-driven abrasive honing, or other type finishing gear rotatable upon a horizontal or vertical axis, the table support or head being relatively adjustable with respect to the other to bring the workpiece teeth into operative position with respect to the teeth of the finishing gear. The improvement which comprises a first gear train connecting said transmission to said finishing gear for rotation thereof at a predetermined speed. A drive spindle is journalled through said head stock adapted for axial drive engagement with the workpiece gear to be finished. A second gear train interconnects said transmission with said drive spindle for rotation at a predetermined speed. A compensating support device mounts a portion of the second gear train to provide for continuous drive thereof during relative vertical adjustments between the table and head. The first gear train has an accumulated backlash therein as does the second gear train. A backlash compensator is mounted on the table and connected to the second gear train for equalizing the backlash in both trains for the initial positioning of the finishing gear teeth with respect to the workpiece teeth. The compensator further functions to modify the accumulated backlash of the second gear train, alternately advancing and retracting the teeth of the workpiece gear with respect to the teeth of the finishing gear, either manually or automatically. Thus, on feed of the workpiece in one direction, one side of the teeth of the finishing gear engages one side of the workpiece gear teeth, and upon feed in the opposite direction, the opposite sides of the finishing gear teeth engage the other sides of the workpiece gear teeth.

25 Claims, 9 Drawing Figures

FIG. 8
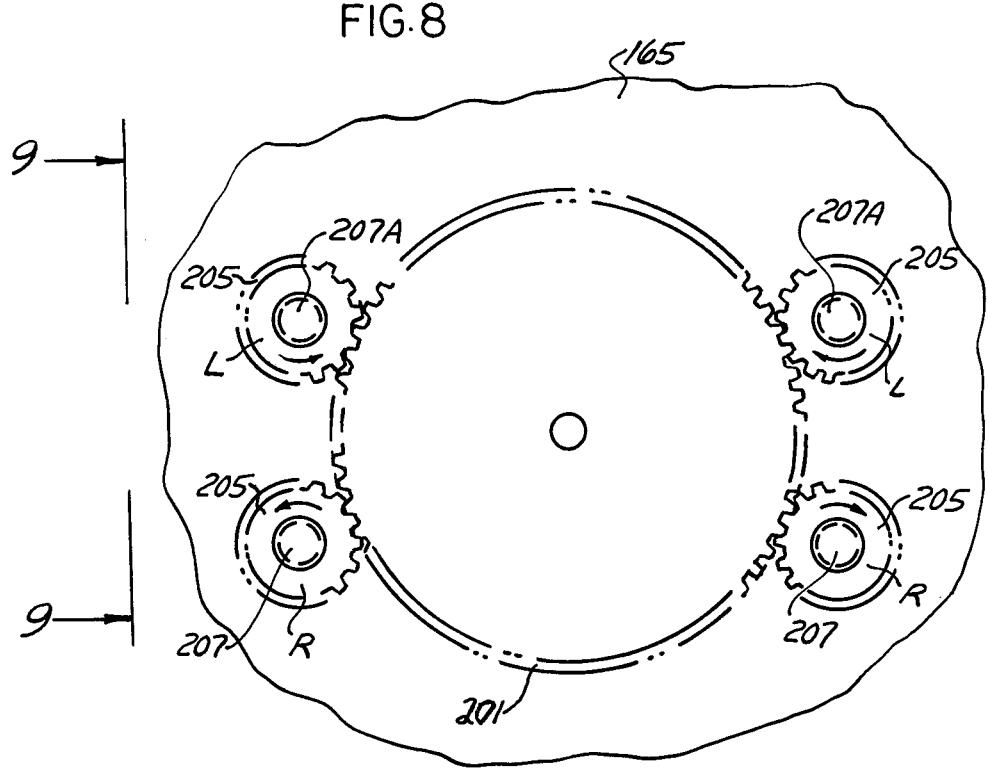
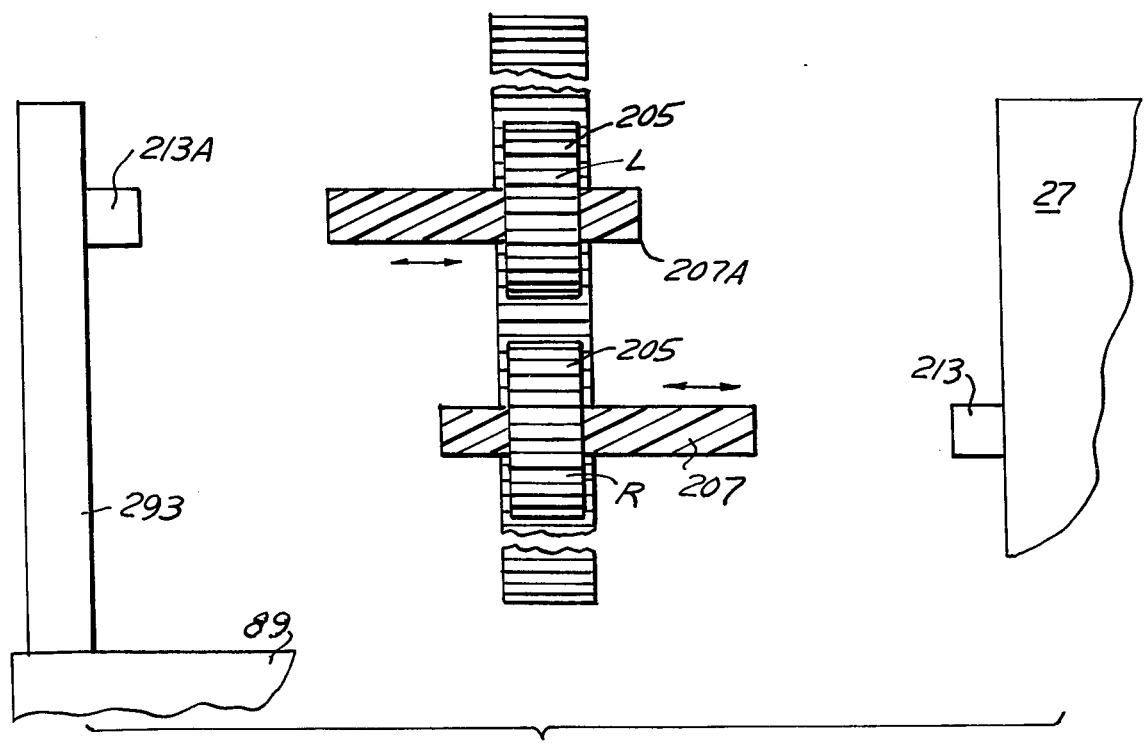
FIG. 9

GEAR FINISHING MACHINE

BACKGROUND OF THE INVENTION

Heretofore, there has existed the problem in the making of gears or splines which are out of concentricity and wherein, diametrically opposed radii are different. If a gear is out of concentricity and is brought together in mesh with another gear, also out of round, the result is that there is a non-uniform pressure applied to all of the teeth of the gears during operation thereof. Other problems include distortion and non-uniformity of gear teeth. This may be caused by heat treatment, inaccurate cutting of teeth, poor cutting tools or material, different tools or other causes.

As exemplified in the prior art such as the following United States Patent Nos.:

2,942,389 3,006,117
3,092,935 3,293,805, the grinding gear also rotatively drives the workpiece gear and, therefore, is at all times in pressure contact with the workpiece teeth throughout all diameters and length of teeth as well as along the involute of the gear or spline. It is undesirable for the workpiece to be rotatably driven by the grinding or other type finishing gear especially when, in the beginning of the grinding or finishing, only certain areas need correction. The grinding gear function must be limited to cutting of the workpiece and not used to drive the workpiece.

SUMMARY OF THE INVENTION

It is an object of the present invention to provide an improved gear or spline finishing machine which utilizes one drive mechanism for the grinding and finishing gear and a separate independent adjustable drive mechanism for the workpiece gear.

It is another object of the present invention to provide a backlash compensator by which, in connection with the accumulated backlash of a first gear train leading to the finishing gear and the accumulated backlash in a second gear train leading to the workpiece gear, means are provided for equalizing the accumulated backlash in the respective gear trains assuring the correct positioning of the workpiece gear teeth with respect to the finishing gear teeth.

It is another object to provide the same backlash compensator to modify the accumulated backlash of the second gear train such as to apply pressure from one side of the teeth of the finishing gear to the corresponding adjacent side of the workpiece gear teeth in one direction of travel of the table which supports the workpiece. By this construction, pressure is, therefore applied automatically by the finishing gear teeth, first to the one sides of the workpiece gear teeth when fed in one direction, and by the other sides of the finishing gear teeth to the other sides of the workpiece gear teeth when fed in the other direction.

It is a further object to provide a backlash compensator which incorporates mechanism operated manually and/or automatically by which accumulated backlash between the respective gear trains can be equalized and the backlash in the second gear train modified.

These and other objects will be seen from the following specification and Claims in conjunction with the appended drawings.

THE DRAWINGS

Figure 6:
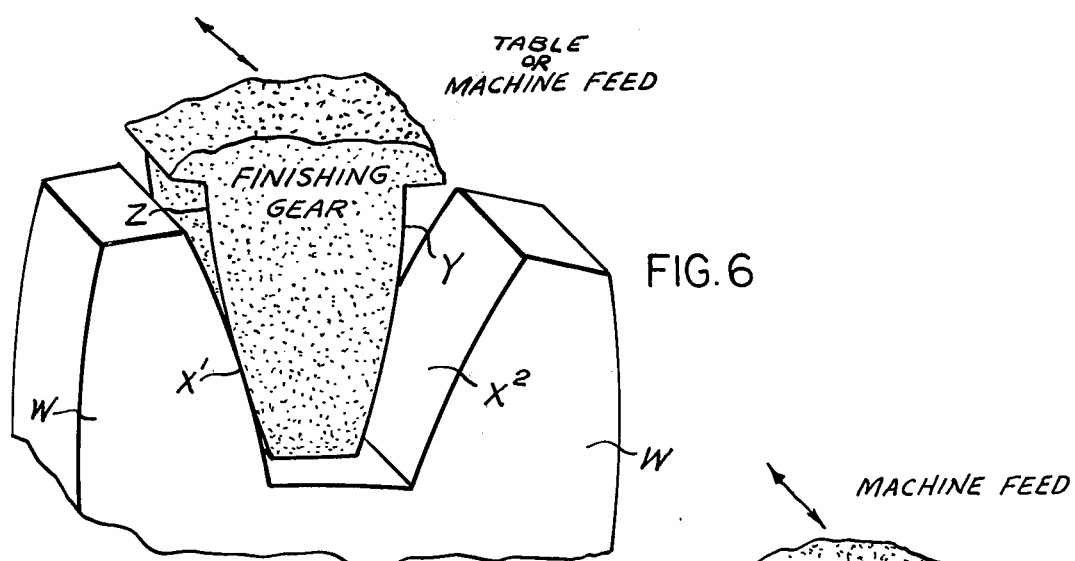

FIG. 6 schematically illustrates the relation of one side of a grinding gear tooth to one side of a workpiece gear tooth for feed in one direction, when the backlash in the second gear train has been modified.

Figure 7:
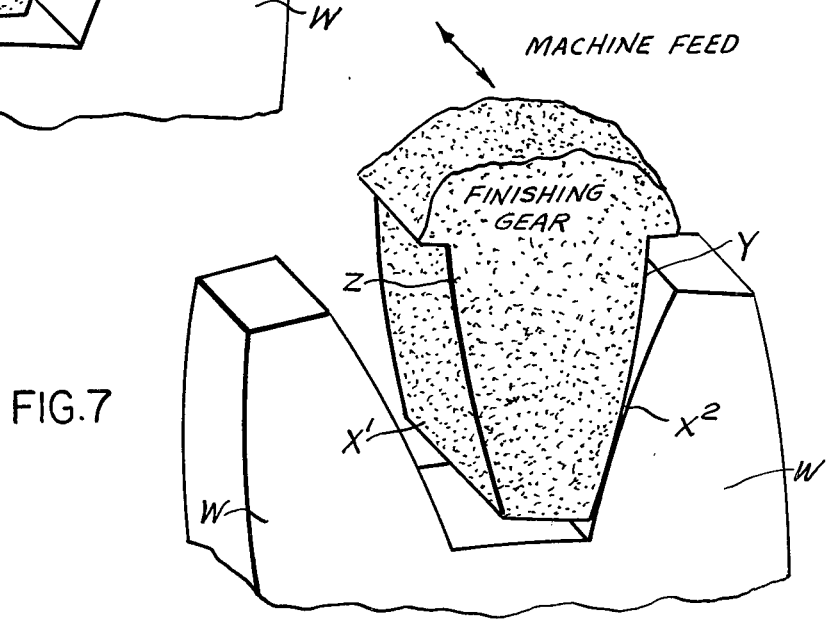

FIG. 7 schematically illustrates the relation of the other side of the grinding gear teeth and workpiece teeth for feed in the opposite direction.

Figure 2:
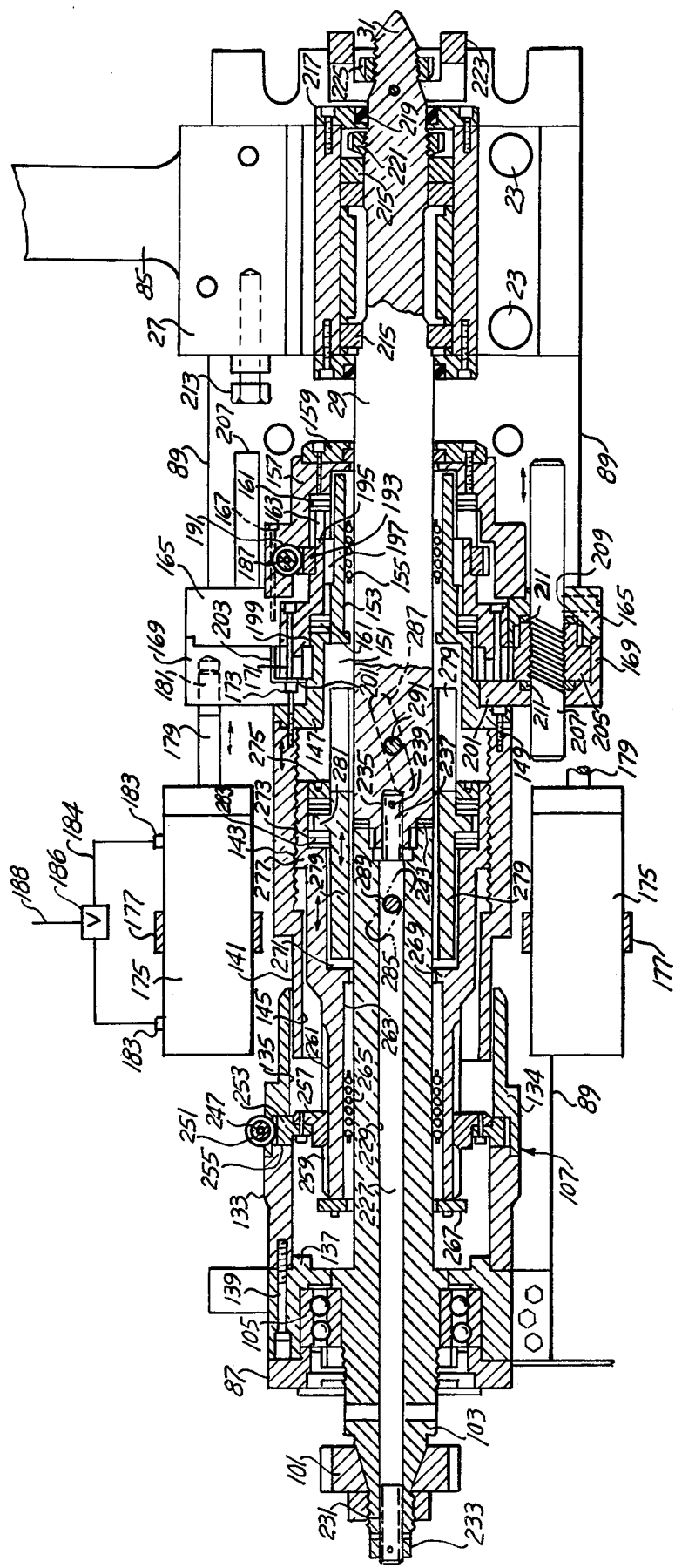
FIG. 2 is a plan section of the backlash compensator and control mechanism operable in conjunction with the head stock of the gear finishing machine, both mounted upon the longitudinally reciprocal table.

FIG. 8 is a schematic end view of the adjustable stop pins on the actuator block of FIG. 2.

FIG. 9 is a schematic view taken in the direction of areas 9—9 of FIG. 8.

It will be understood that the above drawings illustrate merely a preferred embodiment of the invention, and that other embodiments are contemplated within the scope of the Claims hereafter set forth.

DETAILED DESCRIPTION OF THE INVENTION

Figure 1:
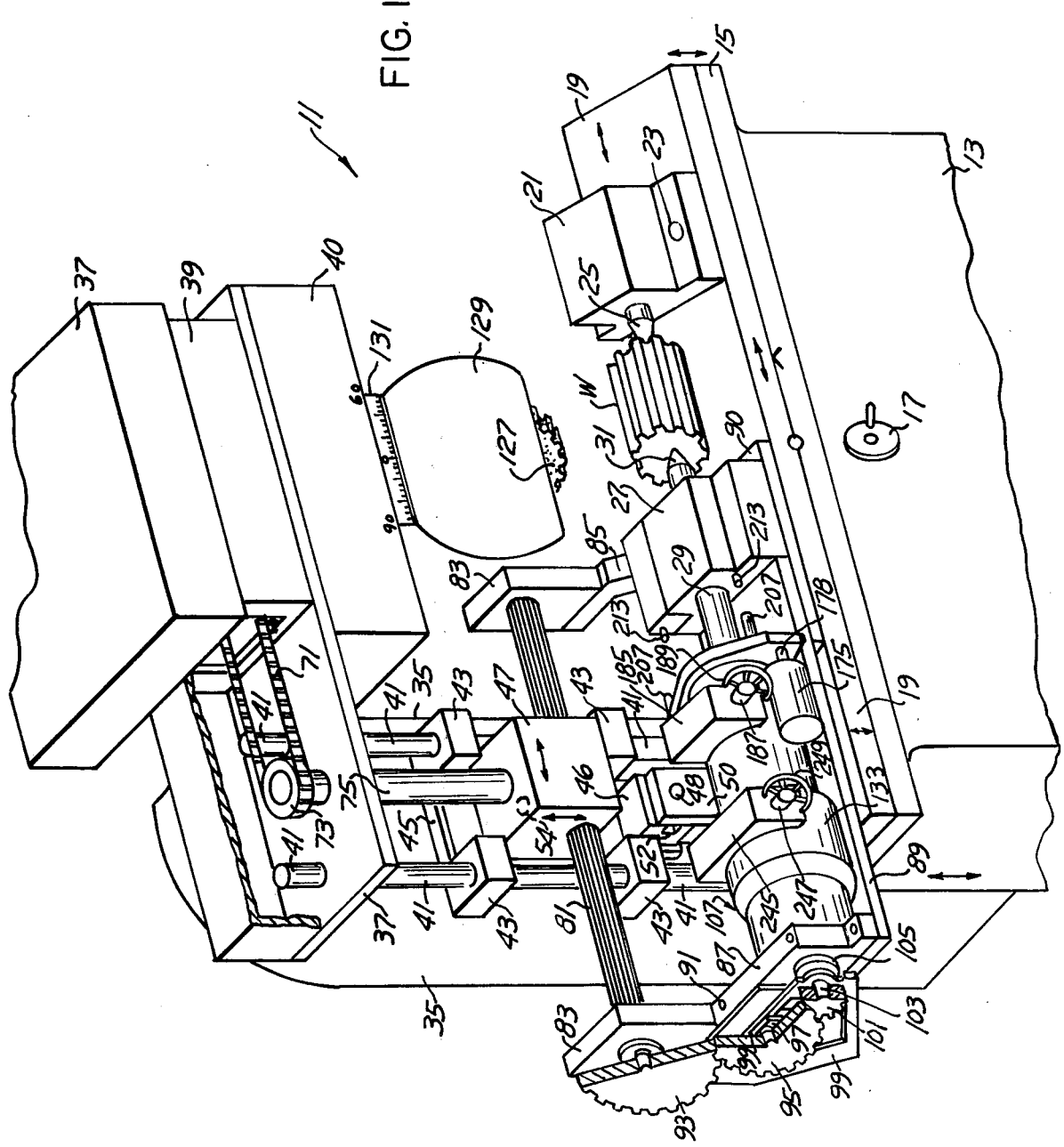
FIG. 1 is a front perspective view of a gear finishing machine utilizing the present gear train backlash compensator.

The present gear finishing machine is generally indicated at 11, FIG. 1, and includes base 13, vertically adjustable table support 15, height adjustment wheel 17 therefore and guidably mounted upon said table support, the longitudinally reciprocal table 19 mounting tail stock 21 adjustably secured by fasteners 23 and including the conventional center 25 for the workpiece gear W.

The present head stock 27 is adjustably mounted upon table 19 and journals the drive spindle 29 and center 31. The latter is axially aligned with tail stock center 25 for drivingly supporting the workpiece gear W sought to be finished.

Figure 4:
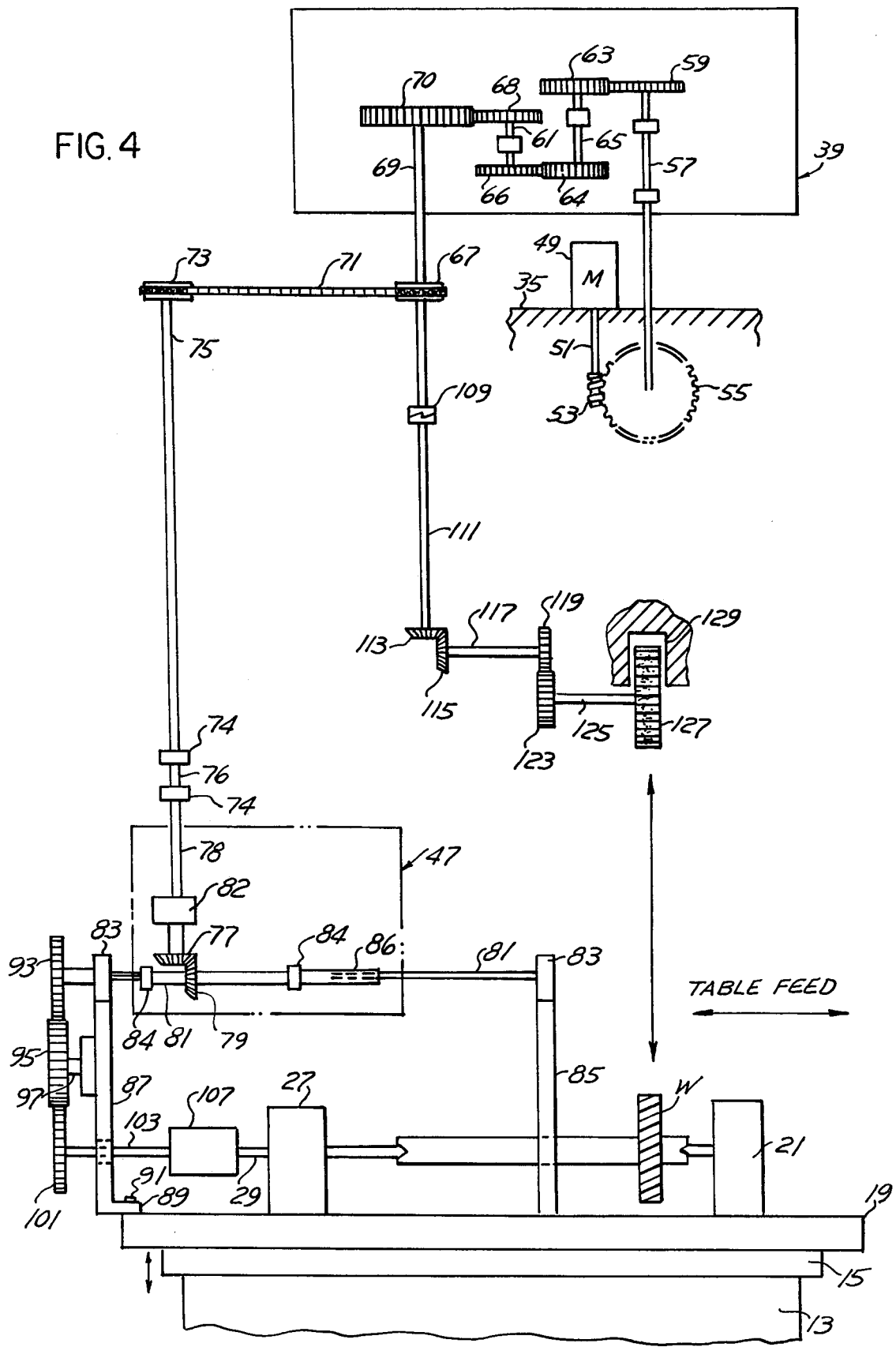
FIG. 4 is a schematic diagram of the power transmission with a first gear train to the grinding gear of the finishing machine and the second gear train leading to the driving and mounting spindle for the gear workpiece and with the backlash compensator incorporated into the second gear train.

The present gear finishing machine includes upright pedestal 35 which includes the forwardly extending top plate 37 which overlies reciprocal table 19 and supports transmission housing 39 and the transmission therein, FIG. 4.

A pair of upright spaced guide rods 41 are mounted upon table support 15 and at their upper ends project movably through top plate 37. Spaced pairs of vertically spaced bearing blocks 43 are movably mounted upon said guide rods and are secured to spaced portions of the upright mount plate 45. Said mount plate at its lower end has a block 46 which is pivoted on the pin 48 mounted on upright plate 50 secured to table 19. Said pin extends into slot 52 of block 46 to permit feed movements of table 19 relative to block 46.

The hollow gear box 47 is pivotally mounted at 54 upon the mount plate 45 and is thus capable of pivotal and vertical adjustments in unison with pivotal and vertical adjustments of table 19 upon table support 15.

As shown in FIG. 1 and schematically in the diagram, FIG. 4, the pedestal 35 mounts the reversible electric motor 49 whose shaft 51 drives the worm 53 in mesh with worm gear 55 whose shaft 57 is suitably journalled within the transmission housing 39. Gear 59 on shaft 57 drives the gear 63 on shaft 65.

In the illustrative embodiment shown schematically in FIG. 4, shaft 65 drives the intermeshing gears 64 and 66 for rotating gear 68 in mesh with gear 70. Said gear is mounted upon the shaft 69 which drives the sprocket gear 67 connected by chain 71 to sprocket gear 73 on the vertical drive shaft 75 which projects into the vertically adjustable gear box 47.

Figure 3:
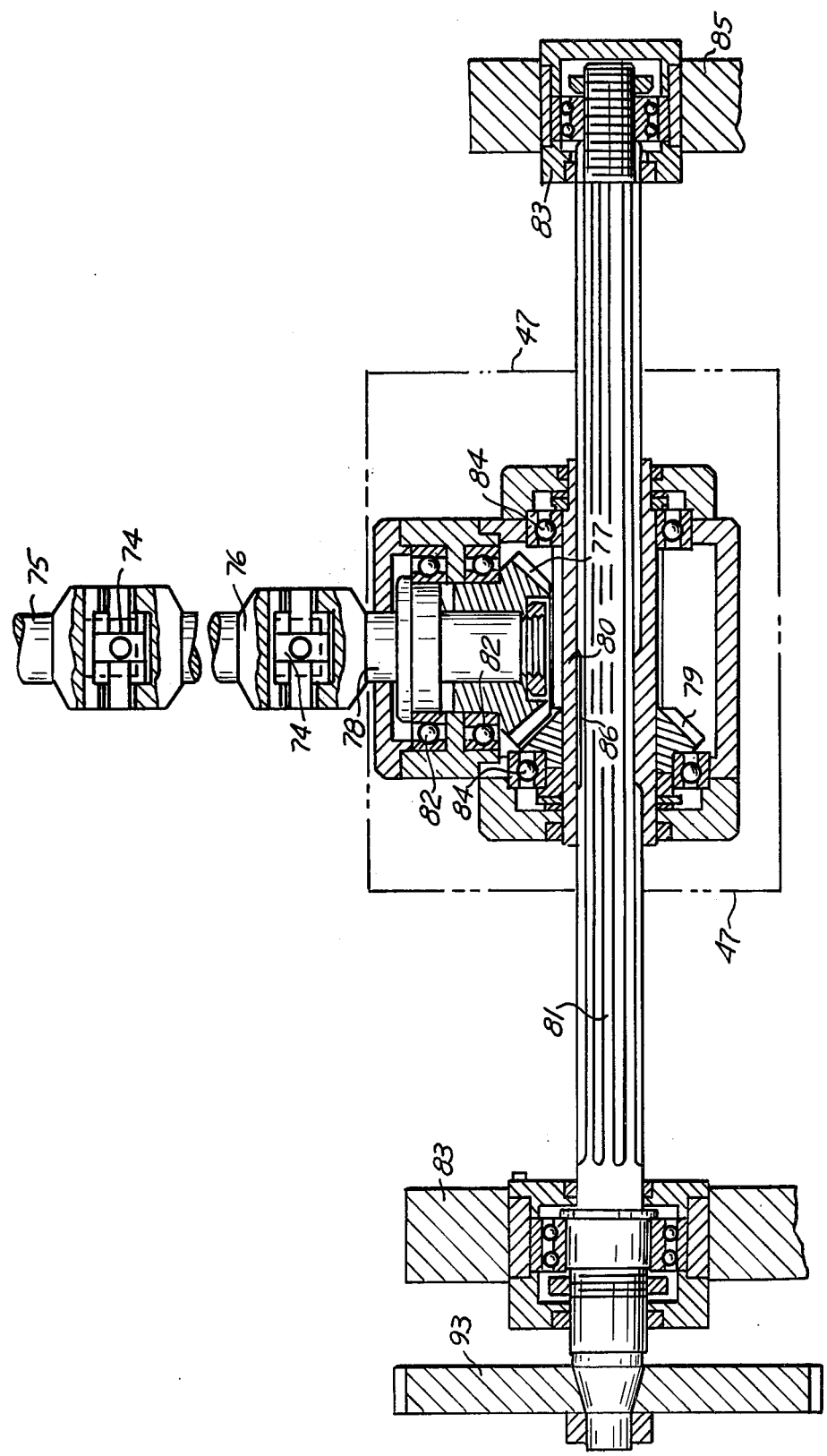
FIG. 3 is a fragmentary front elevational view of the gear box assembly forming a part of the gear train between the transmission and the workpiece gear drive spindle.

As shown in FIG. 3 which is a front elevational view of gear box 47 with the front cover removed, drive shaft 75 has a pair of axially aligned universal drive sections 74 and connected shafts 76,78. Shaft 78 within the gear box is journalled and supported upon bearings 82 therein and mounts bevel gear 77 journalled on bearings 82 and is in mesh with the right angularly related bevel gear 79 mounted upon bearings 84. The universal drive sections 74 are required since gear box 47 is tiltable.

Bevel gear 79 has an internal sleeve 80 which is interiorly splined at 86 and slidably receives therethrough the transversely extending splined shaft 81. The opposite ends of said splined shaft are journalled and supported upon journal blocks 83. One journal block is supported by the bracket arm 85 secured to the head stock 27 on the reciprocal table 19. The other bearing block 83 is mounted upon the support bracket 87 secured at 91 upon the table extension 89 which overlies and is fixedly secured to the head stock mount plate 90, FIG. 1.

Therefore, longitudinal reciprocal movements of the table 19 effects simultaneous movements of the spline shaft supporting brackets 85 and 87 and concurrent longitudinal reciprocation of the spline shaft 81 with respect to the gear box 47 and the internally splined drive gear sleeve 80 within said gear box.

The change gear 101, FIGS. 1 and 2, is mounted on and secured to the drive shaft 103 which is journalled through the bearing block 105 within the bracket 87.

Said drive shaft, as described hereunder, extends axially into the housing 133 of the backlash compensator 107 and is in operative engagement with and axially aligned with spindle 29 which projects into the opposite end of housing 133. Said spindle is journalled through head stock 27.

Referring back to the schematic diagram, FIG. 4, the output shaft 69 within transmission housing 39 through the coupling 109 is axially connected to shaft 111 mounting the bevel gear 113. Bevel gear 113 meshes with right-angularly related bevel gear 115 upon shaft 117 which drives the gear 119 and the intermeshing gear 123 connected to the drive shaft 125.

Said drive shaft mounts the honing or finishing gear 127 which is nested, supported and journalled within the machine head 129. Said head is suspended from support 40 on pedestal 35, and is mounted in a conventional manner for rotation about a vertical axis with respect to the spaced calibrations 131 which extend from 0 degrees to 90 degrees for illustration upon opposite sides of a corresponding zero marking upon the machine head.

The driven shaft 125 journalled within said head mounts the abrasive grinding gear 127 which is rotatable upon a horizontal axis in a plane generally parallel to the workpiece axis, FIG. 1. The axis of rotation of shaft 125 can be modified, in a conventional manner, so as to lie at an acute angle with respect to the axis of rotation of the workpiece gear W, up to 90 degrees.

Constructions of that type are shown in further detail in the above listed United States Patents and further description of the machine head is omitted.

As hereafter described, there is a first gear train which transmits power from the transmission housing 39 to honing or finishing gear 127 and a second gear train which transmits rotative power from the transmission housing to drive shaft 103 through backlash compensator 107 and the aligned spindle 29 which drivingly engages and rotates the workpiece W.

The first gear train, as shown in FIG. 4, includes from the motor 49, the elements 51, 53, 55, 57, 59, 63, 65; gearns 63, 66, 68; shaft 61; gear 70 on output shaft 69, coupling 109, shaft 111, gears 113 and 115, shaft 117 and gears 119 and 123 and shaft 125. The second gear train is connected to the first gear train and includes the output shaft 69, sprocket 67, chain 71, sprocket 73, drive shaft 75 through universal connections 74, shafts 76,78 into gear box 47, bevel gears 77 and 79, spline shaft 81, change gears 93,95 and 101 on bracket 99 and the drive shaft 103, FIG. 1.

The grinding gear 127 rotates at approximately the same RPM as the spline shaft 81. The proportional speed of rotation of workpiece W and grinding gear 127 is accomplished by the replaceable change gears 93, 95 and 101 so that, in effect, the honing gear 127 is rotating, in operation, in mesh with the teeth of the workpiece W. For the gear finishing operation, it is necessary that there be an upward adjustment of the table support 15 and table 19 until the teeth of the honing gear are in operative mesh with the workpiece gear teeth. Such vertical adjustment of the table 19 effects a corresponding vertical movement of the gear box mount plate 45 and the associated bearing blocks 43 and the guide shafts 41.

A universal connecting mechanism is incorporated into the present construction so that on vertical adjustments of the table 19 and corresponding vertical movements of the splined power shaft 81, there is such universal connection between the shafts 76,78 driven by the shaft 75 that throughout such vertical adjustments of table 19, there will be continuous rotative drive through the second gear train which delivers power to drive shaft 103.

The grinding or honing gear 127 can be made in accordance with applicant's U.S. Pat. No. 3,613,472 dated Oct. 19, 1971, and U.S. Pat. No. 3,868,235 dated Feb. 25, 1975, and other patents or developments.

The teeth of the finishing gear 127 are coated with carbide particles and are adapted for operative honing and grinding engagement with the teeth of the corresponding workpiece gear W. Whereas, in the prior art patents above referred to, the honing or finishing or grinding gear was in driving engagement with the workpiece gear to be finish ground, in the present disclosure, the first gear train is for transmitting rotative power from the transmission housing 39 to the grinding gear 127.

The second gear train separately transmits rotative drive power from the transmission to the power-drive spindle 103 for effecting rotation of the workpiece by its own individual drive.

In the prior art, the grinding gear drove the workpiece gear. This is undesirable, because it provided unnecessary driving pressure upon the grinder and workpiece. The life of the grinding gear was reduced. The correct involute of the workpiece could not always be generated or corrected. By utilizing the presently disclosed separate drive for the workpiece gear, the grinding gear is used only for grinding the accurate form and spacing of the teeth of the workpiece.

It is recognized that in the use of gear trains, such as gear train #1 and #2 above described, there will be an accumulated backlash in each of these gear trains which could result in a differential between the location of the gear teeth of the grinding gear 127 and the teeth of the workpiece gear W.

The present invention provides a backlash compensator, generally indicated at 107, FIG. 1, for equalizing the backlash of the second gear train with respect to the backlash in the first gear train. Said compensator can further advance or retract the workpiece teeth relative to the grinding gear teeth, i.e., modify the backlash in the second gear train.

Figure 5:
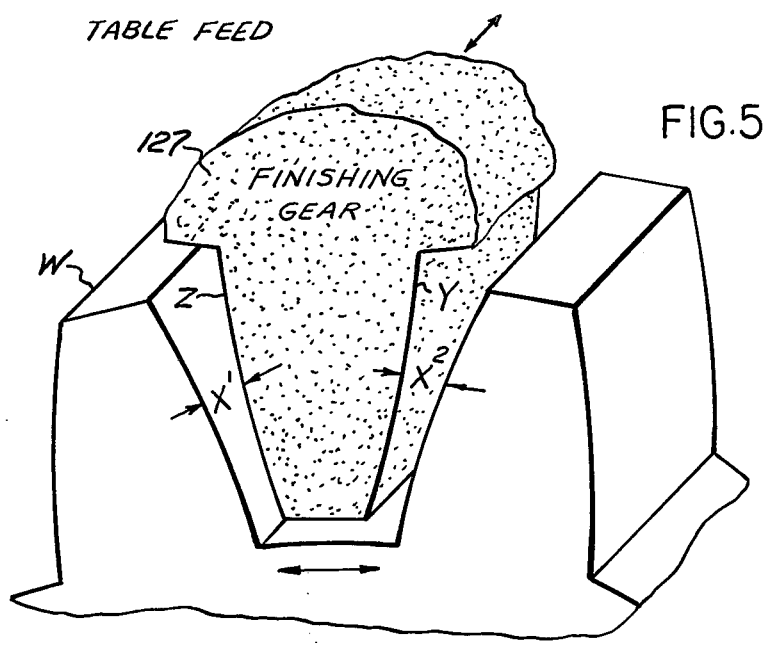
FIG. 5 is a perspective schematic view illustrating the positioning of the tooth of the grinding gear with respect to the teeth of the workpiece gear, fragmentarily shown when the compensator has equalized the backlash in both gear trains.

Thus, with the finishing gear 127 and the splined shaft 81 rotating at approximately the same speed, through the change gears 93,95 and 101, there will be the proper relationship established between the teeth of the respective gears, such as shown schematically in FIG. 5, indicating the distances along the pitch diameters X1 and X2. It is, therefore, possible by the present backlash compensator to locate a tooth of the finishing gear 127 with respect to an adjacent pair of teeth on the workpiece W, equalizing the measurements X1 and X2. Said compensator will also increase X1 and reduce X2, or decrease X1 and increase X2, depending upon the direction of rotation of the finishing gear and workpiece and the direction of feed of the table and the workpiece mounted thereon.

For example, when the table 19 is reciprocated with respect to the honing or grinding gear 127, it is desirable that the trailing surface of the teeth of the work gear W be more closely spaced with respect to the advancing teeth surface of the grinding gear. This means that the dimension X2 should be increased and the dimension X1 decreased, for one direction of table movement, as in FIG. 6. For feed movement in the opposite direction, the dimension X2 is reduced and the dimension X1 increased, as in FIG. 7, or vice versa.

The distances X1 and X2 can be automatically or manually modified for each cycle of table 19.

The present backlash compensator 107, FIG. 1, mounted upon the table extension 89 is shown in further detail in FIG. 2 which is a plan view thereof. The present compensator includes the housing 133,134 having a bore 135 which receives the annular flange 137 on bracket 87 and is secured thereto by fasteners 139.

Elongated backlash control sleeve 141 adjustably projects into the bore 135 of said housing and has intermediate its ends an interally threaded portion 143 within bore 145.

Support sleeve 147 is aligned with sleeve 141 and has an annular flange which is secured thereto by the fasteners 149. Support sleeve 147 has a bore 151 and a counter bore 153. Interposed between the counter bore 153 and the spindle 29 is the bearing 155.

The head 157 with axially apertured end cap 159 receives a portion of the support sleeve 147. A series of longitudinally spaced bearings 161 are nested within the bore 163 within head 157. Said head at one end projects into actuator block 165 and is secured thereto by a series of fasteners 167. The control ring 169 bears against actuator block 165 and is secured thereto by fasteners 171.

The control ring 169 is, in turn, secured to the support sleeve 147 and, in turn, to the end of the backlash control sleeve 141 as by the fasteners 173.

A pair of parallel spaced power cylinders 175, such as air or hydraulic cylinders, are mounted upon the table extension 89 and secured thereto as at 177. Each cylinder includes a reciprocal piston rod 179 and associated piston with the outer ends of the respective rods projected into and secured to the control ring 169 as at 181.

Fittings 183 are arranged at opposite ends of the cylinders and are connected to conduits 184 and the reversable valve 186 which receives pressure fluid, such as compressed air or oil, as at 188. At the end of each feed movement of table extension 89, the valve is automatically reversed.

As shown in FIG. 1, the stop control housing 185 is mounted upon backlash control sleeve 141 and extends transversely thereof and journals therein the rotatable shaft 187 mounting hand wheel 189, fragmentarily shown. The inner end of said shaft mounts a worm 191 in mesh with worm gear 193 secured upon one end of the rotatable connector sleeve 195. Said connector sleeve is rotatively journalled by the bearing 197 upon support sleeve 147. A portion of said connector sleeve extends into the counter bore 199 within actuator block 165 and mounts the gear 201 within the bore 203 of control ring 169.

Gear 201 is in mesh with gear 205 threaded upon non-rotatable longitudinally adjustable stop pin 207. Said stop pin extends through a bore 209 within actuate block 165 and is adapted for longitudinal adjustments as indicated by the arrow in FIG. 2. Gear 205 is adapted for rotation with respect to the bearings 211 within block 165 and actuator ring 169.

While one such adjustable stop pin 207 is described, with reference to FIG. 2, there are a pair of such stop pins shown in FIG. 1, which are normally spaced from corresponding adjustable stops 213 which are aligned therewith and adjustably secured within the head stock 27. As shown in FIGS. 8 and 9, there are an additional pair of stop pins 207A which limit movements in the opposite direction. Pins 207A are the same construction as pins 207, except that the threading thereon is opposite from the threads on pins 207. Pins 207A are in mesh with the same gears 205 in mesh with drive gear 201. Pins 207A project from actuator 165 in the opposite direction. These pins are adapted to engage the second set of stops 213A, FIG. 9, on bracket 293 on table extension 89. When pins 207 move inwardly at a predetermined amount, the other pins 207A simultaneously move inwardly the same amount.

Internal spaced bearings 215 within said heat stock axially journal spindle 29 which projects out through the apertured cap 217 which mounts the annular seal 219. The nut 221 is threaded onto spindle 29 and operatively engages the bearings 215 to restrain the spindle against endwise movement relative to the head stock 27. Workpiece anchor plate 223 is axially mounted upon said spindle and is secured thereto by the nut 225 threaded onto an end portion of the spindle which terminates in the center 31.

Elongated tie rod 227 extends loosely through the bore 229 of the drive shaft 103 and at its outer end, is threaded thereto at 231 and includes the stop 233 secured upon the end of said tie rod, FIG. 2. The opposite end of the tie rod extends into the axially aligned bore 235 at the inner end of the spindle 29 and is threadedly secured thereto at 237. Said securing also includes the transverse pin 239.

Thrust bearings 243 are interposed between the inner engaging ends of drive shaft 103 and the spindle 29.

By this construction, the spindle 29 is axially in alignment with the drive shaft 103 and is adapted for rotative angular adjustment with respect to the drive shaft 103 for the purpose of backlash compensation between the two gear trains as above described.

The present backlash compensator includes angle control housing 245, FIG. 1, which is mounted upon the backlash housing 133, transversely thereof and receives and journals the shaft 247 mounting hand wheel 249. The inner end of said shaft mounts the worm 251 in mesh with worm gear 253 which is rotatively nested within the internal annular groove 255 in housing 133. Said worm gear is mounted on and secured to an internal spline sleeve 257 which slidably receives the spline 259 on the angle control sleeve 261.

The elongated angle control sleeve 261 is nested within the bore 145 of sleeve 141 and is coaxial therewith, and includes an internal bore 263. Within said bore is a bearing 265 which cooperatively registers with drive shaft 103. Apertured stop plate 267 is mounted over one end of angle control sleeve 261 and secured thereto, FIG. 2.

Intermediate the ends of the angle control sleeve 261 is an internal flange 269 or shoulder which terminates in the counter bore 271 and adjacent one end thereof, the counter bore 273 closed by the pressure nut 275. Adjacent one end of angle control sleeve 261 is an externally threaded portion 277 which is in threaded mesh with the internal threaded portion 143 of sleeve 141.

Within the bore 271 of the angle control sleeve 261 is an elongated actuator sleeve 279 which overlies and receives corresponding adjacent end portions of drive shaft 103 and spindle 29. External annular flange 281 upon the actuator sleeve extends into the counter bore 273 between bearings 283 on opposite sides thereof and is retained with respect to the angle control sleeve by the adjustable pressure nut 275 on the end thereof.

Accordingly, longitudinal adjustments of the angle control sleeve 261 acting through the flange 281 will effect corresponding longitudinal adjustments of actuator sleeve 279. Formed through the wall of said actuator sleeve adjacent opposite end portions thereof are at least a pair of oppositely inclined angular slots 285 and 287 which extend at an acute angle with respect to the longitudinal axis of said sleeve.

Radial pins 289 and 291 for each slot project laterally from drive shaft 103 and spindle 29 and nest respectively within the corresponding angular slots 285 and 287. Additional pairs of pins and slots the normally required.

Longitudinal adjustments of the actuator sleeve 279 will cause said sleeve to rotate with respect to the drive shaft 103 as cammed by the pin 289 with respect to the angular slot 285. Such rotary movement of the actuator sleeve acting through the cam action of the slot 287 and pin 291 effects a proportional rotation of the spindle 29 with respect to drive shaft 103. This, thus, provides a means for modifying the accumulated backlash in the gear train which leads to the drive shaft 103 in order to properly center the teeth of the workpiece gear with respect to the teeth of the grinding rear, such as shown schematically in FIG. 5.

OPERATION

In operation, longitudinal adjustments of the actuator sleeve 279 will effect corresponding angular adjustments of the spindle 29 with respect to the drive shaft 103 in one direction or the other.

Longitudinal adjustments of the acutator sleeve 279 are accomplished in two ways. In the first instance, hand wheel 249, FIG. 1, and its shaft 247 rotate the worm 251 and effect corresponding rotation of the worm gear 253 to rotate the angle control sleeve 261.

Since the angle control sleeve 261 is in threaded engagement with the then stationary backlash control sleeve 141, such rotation of the angle control sleeve will effect longitudinal adjustment thereof in one direction or the other and through the flange 281, effects a corresponding longitudinal adjustment in one direction or the other of the actuator sleeve 279. This, in turn, effects relative angular rotation of the spindle 29 with respect to drive shaft 103. Such manual adjustment, as shown in FIG. 5, can equalize the distances X1 and X2 between the respective gear teeth of the finishing gear and workpiece such as to the position shown in FIG. 5.

Reciprocal longitudinal adjustments of the actuator sleeve 279 can be effected in an automatic manner by the operation of the cylinders 175, acting in unison, causing reciprocal movements of the rods 179 and the connected control ring 169. Since the control ring 169 is fixedly connected to the backlash control sleeve 141, such reciprocal movements of the piston rods 179 and connected control ring 169 will effect corresponding longitudinal adjustments of the backlash control sleeve 141. Since the angle control sleeve 261 is threadedly connected thereto, such longitudinal reciprocations of the backlash control sleeve 141 will effect corresponding longitudinal adjustments of the angle control sleeve 261 and the internally connected actuator sleeve 279.

With reference to FIG. 5, since there is normally an unequal accumulation of backlash with respect to the two gear trains, namely, the gear train which leads to the grinding gear and the gear train which leads to the drive shaft 103, an initial manual adjustment of the hand wheel 249 will effect angular rotation in one direction or the other of the spindle 29 with respect to drive shaft 103. This will have the result of translating the teeth of the workpiece W with respect to the adjacent teeth of the grinding gear 127 for setting the distances X1 and X2 between the teeth of the respective gears.

Thus, operation of the hand wheel 249 provides a means for manually effecting longitudinal adjustments of the angle control sleeve 261 and, in turn, rotary adjustments of the spindle 29 with respect to the drive shaft 103.

Depending upon the direction of feed of the table 19 carrying the workpiece gear with respect to the grinding gear, it is desirable that there be an increased pressure of the leading edge Y with respect to the adjacent side of the workpiece tooth when the table is being fed to the left so that the X2 distance is reduced and the X1 distance is increased, FIG. 7, or vice versa.

When the table is fed in the opposite direction, it is desirable that the opposite side of the gear tooth at Z be more closely adjacent to the leading edge of the adjacent workpiece tooth, FIG. 6, for increased pressure during finishing and grinding. Since the table 19 is fed longitudinally and reciprocates in a continuous manner, it is desirable that there be an automatic adjustment of these distances X1 and X2 at the end of each cycle of the table 19. Normally the honing gear and workpiece gear are rotatable in meshing first directions upon feed of the table in one direction, and rotatable in opposite meshing directions on feed of the table in the opposite direction. There are a plurality of reciprocal feed movements of said table during finishing of said workpiece gear.

Accordingly, at the end of the longitudinal feed of the table in each direction, a stop on the table is adapted to reverse the valve 186, FIG. 2, to reverse the flow of pressure fluid to opposite ends of the cylinders 175. Thus, the modification of the backlash of the gear train involving the spindle is automatically controlled in a continuous manner.

During continued reciprocations of the table supporting the head stock and tail stock and the associated workpiece gear, as the gear becomes finished and the metal thereof removed, it is necessary to increase the distances X1 and X2, shown in FIG. 5, to compensate for the metal removed from the workpiece.

Accordingly, there is incorporated into the present construction the adjustable stop pins 207 and 207A which limit the automatic reciprocal feed movements of control ring 169. Therefore, as there is removal of metal from the workpiece, it will be desirable that there be graudal increases in the feeding of the control ring 169 and the connected backlash control sleeve 141 manually or in an automatic manner. Therefore, there is provided the manual control wheel 189 which, upon adjustment and through the gearing 201,205, will cause the stop pins 207 and 207A to be longitudinally retracted to increase the feed movements of piston rods 179 and, in turn, increase the distances X1 and X2 of FIG. 5, and vice versa.

The hand wheel 189, thus, provides a manual or automatic means for regulating the longitudinal setting of the stop pins 207 and 207A. Accordingly, at the beginning, corresponding end portions of the adjustable stop pins 207 and 207A will be closer to the adjustable stops 213, 213A limiting the movements which control the distances of X1 and X2, FIGS. 6 and 7. Thereafter, with metal removed from the workpiece, the stop pins 207 and 207A are gradually retracted manually or automatically to provide for increased longitudinal feed in both directions of the control ring 169 and the connected backlash control sleeve 141.

At the start of a grinding operation, the hand wheel 249 is usually used first to obtain a modification of the backlash of the second gear train relative to the first gear train. This results in the normal centering of the work piece gear teeth relative to the grinding gear teeth, FIG. 5. This is set once.

For a particular setting of the stop pins 207 and 207A, the intermittent reciprocation of piston rods 179 at the end of each stroke of the table and work piece cause an automatic modification of the backlash in the second gear train so that the spindle 29 is angularly adjusted with respect to the drive shaft 103 first in one direction and then in the other direction. This produces the gear tooth relation between the grinding gear and the work piece gears for each relative feed movement of the work piece relative to the grinding gear as in FIGS. 6 and 7.

This is for one or more complete cycles. As work piece teeth are gradually ground away, it is desirable that there be incremental increases of this relative motion between the drive shaft and spindle. This is controlled by gradually and intermittently retracting the stop pins 207 and 207A. The position of said stop pins is controlled by rotation of shaft 187 mannually by hand wheel 89, or automatically.

It is contemplated as a part of the present invention, and equivalent thereto, that the backlash compensating mechanism could be incorporated into the first gear train. Thus, the backlash compensator would be just as effective for determining the correct relationship between the teeth of the grinding gear and the teeth of the workpiece gear. Further, the same results are obtained in approximately the same manner, namely, the backlash of one gear train is modified with respect to the other gear train.

One advantage in applying the backlash compensator to the first gear train would be that the backlash compensator is removed from the workpiece table, thus, freeing up the table and providing more work space thereon.

Having described my invention, reference should now be had to the following claims.

I claim:

1. In a gear finishing machine having a base, a vertically adjustable table support, a horizontally reciprocal table having a head stock and tail stock to axially and rotatively support a workpiece gear to be finished, a pedestal on said base including a top plate overlying said table and mounting a motor-operated transmission, and a machine head depending from said transmission rotatably adjustable upon a vertical axis, and mounting a powerdrive abrasive honing or other type finishing gear rotatable upon a horizontal axis and connected to said transmission, said table support and head being relatively adjustable vertically to bring the workpiece teeth into operative engagement with the teeth of said finishing gear; the improvement comprising:

a first gear train connecting said transmission to said finishing gear for rotation thereof at a predetermined speed;

a drive spindle journalled through said head stock adapted for axial drive engagement with the workpiece gear to be finished;

and a second gear train connecting said transmission to said drive spindle for rotation at a second predetermined speed; said first gear train having an accumulated back lash therein; said second gear train having an accumulated back lash therein;

and a back lash compensator mounted on said table and connected to said gear train, for equalizing the accumulated backlash in the gear trains, and modifying the accumulated backlash in said second gear train.

2. In the gear finishing machine of claim 1, said honing gear and workpiece gear being rotatable in meshing first directions upon feed of the table in one direction, and rotatable in opposite meshing directions on feed of the table in the opposite direction, there being a means for producing a plurality of reciprocal feed movements of said table during finishing of said workpiece gear.

3. In the gear finishing machine of claim 1, a universal support means mounting a portion of said second gear train providing for continuous drive thereof during vertical adjustments of said table support.

4. In the gear finishing machine of claim 3, said universal support means including a pair of spaced upright guide rods interposed between said table support and said top plate; and secured to said table support;

said second gear train including a gear box reciprocally mounted upon said guide rods;

a horizontally disposed rotatable splined shaft movably extending transversely through said gear box;

and a pair of spaced bearing blocks mounted upon said table for movement therewith supporting and journalling end portions of said splined shaft.

5. In the gear finishing machine of claim 4, said second gear train including a pair of aligned universally connected shafts;

a first bevel gear journalled within and upon said gear box and connected to one of said shafts;

and a second bevel gear meshing with said first bevel gear journalled within and upon said gear box on an axis at right angles to the axis of said first bevel gear; and loosely splined to said spline shaft for maintaining continuous drive thereof during reciprocal movements of said spline shaft with said table.

6. In the gear finishing machine of claim 1, calibrations in degrees upon said transmission relatively to which said machine head is rotatable to a preset angle for setting the axis of rotation of said finshing gear at an acute angle in either direction up to 90 degrees to the axis of rotation of the gear workpiece.

7. In the gear finishing machine of claim 1, said second gear train being connected to said first gear train.

8. In the gear finshing machine of claim 1, said second gear train including a series of intermeshing change gears for maintaining the gear workpiece at said second predetermined speed.

9. In the gear finishing machine of claim 4, the mounting of said gear box including an upright mount plate connected to said gear box and to said table;

and laterally spaced pairs of spaced bearing blocks secured to said mount plate and receiving said guide rods respectively.

10. In the gear finishing machine of claim 1, said back lash compensator comprising a housing mounted on said table, having a longitudinal axis in alignment with the axis of said head stock, said drive spindle extending axially into said housing and journalled thereon;

said second gear train including a drive shaft projected axially into and jounalled upon said housing coaxial to and operatively engaging said spindle;

a tie rod extending axially through and at one end, adjustably connected to said drive shaft, the other end of said tie rod being adjustably threaded into said spindle so that said spindle and drive shaft may rotate in unison;

and adjustable means on said housing for angularly rotating said splindle relatively to said drive shaft for advancing or retracting said workpiece gear teeth relative to the teeth of said finishing gear.

11. In the gear finishing machine of claim 10, said adjustable means including an elongated longitudinally adjustable back lash control sleeve coaxial of and extending into said housing and having an internally threaded portion;

an angle control sleeve coaxial to and movably nested within said back lash control sleeve journalled upon said drive shaft and having an externally threaded portion in mesh with said internally threaded portion; said angle control sleeve adapted for longitudinal adjustment with said back lash control sleeve and for longitudinal adjustment relatively thereto;

a longitudinally adjustable actuator sleeve loosely receiving end portions of said drive shaft and spindle and having spaced oppositely inclined angular slots extending at an acute angle to the drive shaft and spindle axes;

radially extending pins on said drive shaft and spindle guidably extending into said angular slots respectively;

an annular flange on said actuator sleeve projecting into and secured to said angle control sleeve for longitudinal movements therewith; whereby longitudinal adjustments of said angle control sleeve and said actuator sleeve effects by a camming action between said pins and slots a proportional rotary adjustment of said spindle relative to said drive shaft;

and operative means connected to said angle control sleeve for effecting longitudinal adjustments thereof.

12. In the gear finishing machine of claim 11, longitudinal adjustment of said angle control sleeve being effected selectively by:

(1) rotation of said angle control sleeve relative to said back lash control sleeve, and;

(2) longitudinal adjustment of said back lash control sleeve.

13. In the gear finishing machine of claim 12, manually rotatable gear means on said housing splined to said angle control sleeve for selectively rotating said angle control sleeve effecting longitudinal ajustments thereof in two directions relative to said back lash control sleeve.

14. In the gear finishing machine of claim 13, said manually operable gear means including an elongated housing mounted upon said back lash housing transversely thereof;

and a hand wheel and shaft journalled through said latter housing and connected to said gear means.

15. In the gear finishing machine of claim 13, the spline connection of said gear means to said angle control sleeve including an internally splined gear in said gear means mounted on a splined portion of said angle control sleeve, whereby said angle control sleeve can feed longitudinally of said gear means during rotation thereof.

16. In the gear finishing machine of claim 12, a control ring mounted over and secured to one end of said backlash control sleeve and extending radially outward thereof;

a pair of spaced cylinder assemblies mounted upon said table upon opposite sides of said backlash control housing including reciprocal pistons and piston rods projecting therefrom at their ends secured to said control ring, for effecting timed reciprocal control movements of said control ring and the connected angle control sleeve.

17. In the gear finishing machine of claim 16, movement in one direction of said control ring causing angular advancing of said spindle and connected workpiece gear teeth relative to said finishing gear teeth, and movement in the opposite direction of said control ring causing an angular retraction of said spindle and connected workpiece gear teeth relative to said finishing gear teeth, so that for longitudinal feeding in one direction of the table and workpiece gear, a predetermined pressure may be established upon the corresponding sides of the finishing gear teeth, and when fed in the opposite direction, a predetermined pressure may be established upon the opposite side of the finishing gear teeth.

18. In the gear finishing machine of claim 16, reversible valve means connected to a source of pressure fluid and to said cylinder assemblies, whereby at the end of feeding of said table in one direction, the valve means is reversed to automatically reverse the movement of respective piston rods and connected control ring, for continuous intermittent reciprocations thereof during continuous reciprocation of said table and timed therewith.

19. In the gear finishing machine of claim 16, first and second stop pins mounted on and extending through said control ring and lying on axes parallel to the direction of movement of said control ring and projecting from opposite sides thereof, respectively;

and adjustable stops mounted on said head stock and table aligned with said stop pins respectively for limiting longitudinal movements of said control ring in opposite directions.

20. In the gear finishing machine of claim 19, said stop pins being longitudinally adjustable inwardly for increasing said longitudinal movements, as the finishing gear gradually cuts into the teeth of said workpiece gear.

21. In the gear finishing machine of claim 20, rotatable gear means on said control ring operatively engageable with said stop pins for effecting longitudinal adjustments thereof relative to said control ring.

22. In the gear finishing machine of claim 21, a connector sleeve journalled upon said support sleeve;

said gear means including a gear mounted on one end of said connector sleeve;

a gear mounted upon the other end of said connector sleeve; said stop pins being restrained against rotation;

and a gear threaded on each stop pin in mesh with said latter gear whereby, manual rotation of said gear means effects longitudinal adjustments of said stop pins.

23. In the gear finishing machine of claim 22, a housing mounted upon said back lash control sleeve transversely thereof, and a shaft including a hand wheel journalled through said housing and connected to said gear means for remote manual or automatic control of the longitudinal positioning of said stop pins.

24. In a gear finishing machine having a base, a vertically adjustable table support, a horizontally reciprocal table having a head stock and tail stock to axially and rotatively support a workpiece gear to be finished, a pedestal on said base including a top plate overlying said table and mounting a motor-operated transmission, and a machine head depending from said transmission rotatably adjustable upon a vertical axis, and mounting a powerdriven abrasive honing or other type finishing gear rotatable upon a horizontal axis and connected to said transmission, said table support and head being relatively adjustable vertically to bring the workpiece teeth into operative engagement with the teeth of said finishing gear; the improvement comprising:

a first gear train connecting said transmission to said finishing gear for rotation thereof at a predetermined speed;

a drive spindle journalled through said head stock adapted for axial drive engagement with the workpiece gear to be finished;

and a second gear train connecting said transmission to said drive spindle for rotation at a second predetermined speed, said first gear train having an accumulated back lash therein; said second gear train having an accumulated back lash therein;

and a back lash compensator mounted on said table and connected to said second gear train, for equalizing the accumulated back lash in the gear trains.

25. In a gear finishing machine having a base, a vertically adjustably table support, a horizontally reciprocal table having a head stock and tail stock to axially and rotatively support a workpiece gear to be finished, a pedestal on said base including a top plate overlying said table and mounting a motor-operated transmission, and a machine head depending from said transmission rotatably adjustable upon a vertical axis, and mounting a powerdriven abrasive honing or other type finishing gear rotatable upon a horizontal axis and connected to said transmission, said table support and head being relatively adjustable vertically to bring the workpiece teeth into operative engagement with the teeth of said finishing gear; the improvement comprising:

a first gear train connecting said transmission to said finishing gear for rotation thereof at a predetermined speed;

a drive spindle journalled through said head stock adapted for axial drive engagement with the workpiece gear to be finished;

and a second gear train connecting said transmission to said drive spindle for rotation at a second predetermined speed, said first gear train having an accumulated back lash therein; said second gear train having an accumulated back lash therein;

and a back lash compensator connected to one of said gear trains, for equalizing the accumulated back lash in the gear trains, and for modifying the accumulated back lash in said one gear train.

* * * * *